United States Patent
Nielsen

(10) Patent No.: US 10,654,408 B2
(45) Date of Patent: May 19, 2020

(54) FRONT BRAKE LIGHT SYSTEM FOR VEHICLES

(71) Applicant: Kipling Christopher Nielsen, San Francisco, CA (US)

(72) Inventor: Kipling Christopher Nielsen, San Francisco, CA (US)

(*) Notice: Subject to any disclaimer, the term of this patent is extended or adjusted under 35 U.S.C. 154(b) by 0 days.

(21) Appl. No.: 15/784,454

(22) Filed: Oct. 16, 2017

(65) Prior Publication Data

US 2019/0111833 A1 Apr. 18, 2019

(51) Int. Cl.
*B60Q 1/44* (2006.01)
*B60Q 1/26* (2006.01)
*B60R 19/50* (2006.01)
*B60Q 1/00* (2006.01)
*B60Q 1/28* (2006.01)
*B60T 7/04* (2006.01)

(52) U.S. Cl.
CPC ........... *B60Q 1/442* (2013.01); *B60Q 1/0041* (2013.01); *B60Q 1/268* (2013.01); *B60Q 1/2665* (2013.01); *B60Q 1/28* (2013.01); *B60R 19/50* (2013.01); *B60T 7/04* (2013.01)

(58) Field of Classification Search
CPC ...... B60Q 1/26; B60Q 1/2661; B60Q 1/2665; B60Q 1/268; B60Q 1/28; B60Q 1/44; B60Q 1/442
USPC ................................. 340/463, 467, 468, 479
See application file for complete search history.

(56) References Cited

U.S. PATENT DOCUMENTS

| | | | | |
|---|---|---|---|---|
| 5,188,445 A * | 2/1993 | Haun | ................... | B60Q 1/2611 340/474 |
| 5,788,358 A * | 8/1998 | Davis | ..................... | B60Q 1/442 340/479 |
| 6,663,271 B1 * | 12/2003 | Giglio | .................. | B60Q 1/0011 362/293 |
| 6,864,787 B1 * | 3/2005 | Veach | ................... | B60Q 1/442 340/468 |
| 2002/0130773 A1 * | 9/2002 | Santa Cruz | ............ | B60Q 1/442 340/479 |
| 2003/0169165 A1 * | 9/2003 | Hall | ........................ | B60Q 1/442 340/479 |
| 2006/0125616 A1 * | 6/2006 | Song | ........................ | B60Q 1/38 340/463 |
| 2010/0177529 A1 * | 7/2010 | Shimizu | ................. | B60Q 1/442 362/541 |
| 2011/0146119 A1 * | 6/2011 | Wagner | ..................... | G09F 9/33 40/452 |
| 2014/0035740 A1 * | 2/2014 | Lettstrom | ............ | B60Q 1/0035 340/479 |
| 2015/0194053 A1 * | 7/2015 | Jensen | .................. | B60Q 1/442 340/944 |

(Continued)

*Primary Examiner* — Toan N Pham
(74) *Attorney, Agent, or Firm* — The Iwashko Law Firm, PLLC; Lev Ivan Gabriel Iwashko

(57) ABSTRACT

A vehicle implementing a brake light indicator system, the brake light indicator system including a brake pedal to allow the vehicle to slow down in response to a driver depressing the brake pedal, at least one front brake indicator light disposed at a front portion of the vehicle, and a sensor to transmit a signal to the at least one front brake indicator light in response to the driver depressing the brake pedal, such that the at least one front brake indicator light illuminates in response to receiving the signal.

10 Claims, 7 Drawing Sheets

(56) References Cited

U.S. PATENT DOCUMENTS

2015/0375673 A1\* 12/2015 Testai ................... B60Q 1/268
362/545

\* cited by examiner

FRONT BRAKE LIGHT SYSTEM FOR VEHICLES

BACKGROUND OF THE INVENTION

1. Field of the Invention

The present general inventive concept relates generally to vehicle brake light systems and, more specifically, to front safety brake lights for a vehicle.

2. Description of the Related Art

Conventional rear brake lights are universally used in all automobiles around the world, in order to indicate to other vehicles behind a particular vehicle, that the particular vehicle is preparing to slow down and/or stop. However, there are no commonly-used indicators on vehicles to alert pedestrians from a front portion of a vehicle, that the vehicle is about to slow down and/or brake.

With the development of driverless cars, front brake indicators are necessary to allow pedestrians to see that a driverless car is indeed braking when the pedestrians are passing in front of the driverless car when it is in motion.

Various types of front brake light systems have been attempted in the past, as follows:

U.S. Pat. No. 3,665,392 inventor: John T. Annas Issued: May 23, 1972

A driver communication signal mounted against the front windshield of a motor vehicle, visible to pedestrians and on-corning traffic and automatically energized upon brake application to indicate driver's intention to stop. The invention provides a double light source and driver observed light source monitoring means as well as provision to ensure good visibility even on bright sunshine days.

U.S. Pat. No. 4,532,578 Inventor: David W. Gaden et al. issued: Jul. 30, 1985

A vehicle body lamp mounting arrangement wherein a vehicle body lamp assembly includes linear retention flanges on its upper and lower walls which engage behind and in face to face relationship with linear retention flanges of a body lamp opening to releasably retain the lamp assembly within the opening against movement outboard thereof.

U.S. Pat. No. 4,940,962 Inventor: Jerry L. Sarokin Issued: Jul. 10, 1990

A braking indicator for vehicles provides an indication from the front of the vehicle that the vehicle brakes are being applied. The indicator includes a plurality of lights, preferably two, which are mounted and viewable from the front of the vehicle. The first sensor is connected to the brake pedal to detect the initial depression of the brake pedal. A second sensor is connected to the brake system of the vehicle to sense further depression of the brake pedal. The first and second sensors are connected to certain of the front mounted indicator lights to energize certain of the front mounted indicator lights upon the initial depression of brake pedal and further depression of the brake pedal. Alternately, a sensor is connected to the speedometer of the vehicle to detect the speed of the vehicle. The speed sensor provides an output when the vehicle reaches a pre-determined speed, preferably a slow speed. The second sensor and the speed sensor cooperate to energize certain of the indicator lights during continued depression of the brake pedal when the vehicle reaches the pre-set slow speed.

U.S. Pat. No. 5,188,445 Inventor: Harold Haun et al, Issued: Feb. 23, 1993

An emergency response vehicle such as an ambulance is provided with a warning unit that provides a visual and audible warning signal. The warning unit is mounted in a recess or cutout in the hood which covers the engine compartment of the vehicle. This positioning of the warning unit avoids blockage of the air flow through the radiator required for cooling of the vehicle engine. Brackets or other suitable devices are used to mount the warning unit, preferably to a wall such as a radiator support, so that the warning unit remains stationary during opening and closing of the hood. The wall also serves to block rearward passage of the noise generated by the warning unit.

U.S. Pat. No. 5,255,165 Inventor: John N. Cail Issued: Oct. 19, 1993

A brake light assembly in the form of a rectangularly shaped housing is adapted to be mounted on the inside surface of the front windshield of an automobile or similar vehicle. The assembly includes a reflective lens facing forward, a series of lamps configured in a column and mounted within the housing behind the lens, a power cord for attachment to the vehicle's conventional brake light circuit, and a pair of suction cups for affixing the assembly to the inside surface of the vehicle windshield. In an alternative arrangement, a flexible rim is provided on the anterior of the housing for blocking light leaks which might interfere with the driver's normal vision, and which furthermore, includes an activatable adhesive for affixing the housing rim to the inside surface of the windshield.

U.S. Pat. No. 5,373,426 Inventor: Alan L. O'Sullivan Issued: Dec. 13, 1994

A vehicle brake light signal for alerting pedestrians or other vehicle drivers positioned in front of a vehicle to a deceleration of the associated vehicle. The device includes signal assembly which may be secured to a front area of the vehicle. The signal assembly is electrically coupled to both the brake lights of the vehicle and a variable rate flasher. Upon a depression of the brake pedal of the vehicle, the signal assembly will illuminate or flash to warn others of the vehicle's deceleration. Alternate embodiments of the present invention further include a variable aperture assembly controlled by a deceleration sensor for varying the intensity of the signal assembly as a function of the vehicle's deceleration, and a lens cover positionable over the signal assembly operable to produce three distinct light zones.

U.S. Pat. No. 5,537,091 Inventor: Harold L Hull et al. Issued: Jul. 16, 1996

A method of using the existing wiring circuits of a vehicle to provide a front braking indicator signal without adding any components other than two "jumper" cables between properly identified circuits to cause the front turn signals to act in unison with the back turn signals when the braking circuit is energized.

U.S. Pat. No. 5,680,101 Inventor: Laurence S. Pitcher Issued: Oct. 21, 1997

A light of standard color is illuminated when the braking means of a vehicle is applied. The light is extinguished when the braking means are released. The light is located on the forepart of a vehicle preferably in the mid-line, facing in a forward direction the light beam emanating therefrom projecting towards the front of a vehicle, and is so placed at or above dash-board level so as to be clearly visible to other vehicles or persons facing said vehicle or through the rear view mirror if such an equipped vehicle is approaching from behind. The forward facing brake light is one in number to avoid confusion with standard double or multiple rear brake lights and is visible both day and night when brakes are activated.

U.S. Pat. No. 5,758,944 Inventor: Gary David Jandron Issued: Jun. 2, 1998

Vehicle side/front brake lights comprising a brake indicator bulb located in a recessed formed in a side of a vehicle at a front extent thereof. The brake indicator bulb is actuated upon braking of the vehicle. Also, a cover with a red hue is coupled over the recess allowing the brake indicator light to disperse a red light from the side of the vehicle upon braking thereby warning pedestrians, bicycles, and other vehicles to a side/front thereof.

U.S. Pat. No. 5,788,358 Inventor: Richard E. Davis Issued: Aug. 4, 1998

A brake light for an automobile having a windshield, a rear view mirror and a brake light circuit. The light is supported on the mirror by a support and keeper pivoted to the support for gripping the mirror holder. Second, third and fourth embodiment each having a support means and a keeper having a projection on the support means and spaced legs on the keeper that are received on each side of the projection. A second embodiment has external teeth on the projection that receive internal teeth on the keeper for holding the keeper in clamped relation with the projection to clamp a support member between them. A third embodiment has a projection and spaced legs on the support spaced outwardly from the projection. The leas on the keeper are received between the legs of the support means and the projection. The legs on the support have internal teeth that engage external teeth on the legs of the keeper and resilient means on the keeper legs hold the teeth on the keeper in engagement with the teeth on the projection.

U.S. Pat. No. 5,798,691 Inventor: Nien Tsu Tim Kao Issued: Aug. 25, 1998

An accessory brake light system for automobile includes an elongated housing having a receiving cavity therein and a front transparent shield covering the receiving cavity, a lighting apparatus having a plurality of brake lighting LEDs mounted within the receiving cavity of the elongated housing, an electrical controlling device for connecting the lighting apparatus with the power source of the automobile and activating the lighting apparatus to provide lighting when the automobile is braked, and a mounting means for firmly securing the elongated housing to a frontmost central position of the automobile, such as a central position on the front bumper, the front license case, or a radiation cover positioning between the two front head lamps of the automobile. Whereby the automobile can provide specific warning signals when the automobile is braking to slow down or fully stopped, in order to enable the other vehicles or pedestrians that are positioned in front of the vehicle to clearly aware that whether the driver of that vehicle is preparing to stop or not and hence reduce the chance of accident from happening.

However, none of the aforementioned brake light indicator systems are innovative and clearly visible for pedestrians in all potential circumstances.

Therefore, there is a need for a front brake light indicator system that is visible for pedestrians in all circumstances.

SUMMARY

The present general inventive concept provides a vehicle implementing a front brake light indicator system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle implementing a brake light indicator system, the brake light indicator system including a brake pedal to allow the vehicle to slow down in response to a driver depressing the brake pedal, at least one front brake indicator light disposed at a front portion of the vehicle, and a sensor to transmit a signal to the at least one front brake indicator light in response to the driver depressing the brake pedal, such that the at least one front brake indicator light illuminates in response to receiving the signal.

The vehicle may further include a rearview mirror disposed at the front portion of the vehicle, wherein the at least one front brake indicator light is disposed at a non-mirrored side of the rearview mirror.

The at least one front brake indicator light may be a single light extending across the non-mirrored side of the rearview mirror.

The at least one front brake indicator light may include a first light disposed on a left side of the non-mirrored side of the rearview mirror and a second light disposed on a right side of the non-mirrored side of the rearview mirror.

The vehicle may further include a windshield disposed at the front portion of the vehicle, wherein the at least one front brake indicator light is disposed on or within the windshield.

The at least one front brake indicator light may be at least one of a matrix of very small lights and light-strings disposed across an entirety of the windshield.

The vehicle may further include a windshield frame disposed at the front portion of the vehicle, wherein the at least one front brake indicator light is disposed around at least a portion of the windshield frame.

The vehicle may further include a hood disposed at the front portion of the vehicle, wherein the at least one front brake indicator light is disposed at at least a portion of the hood.

The vehicle may further include a front end at the front portion of the vehicle, wherein the at least one front brake indicator light is disposed at at least a portion of the front end.

The vehicle may further include a front end at the front portion of the vehicle, and head lights disposed at the front end, wherein the at least one front brake indicator light is disposed at at least a portion of the front end near the head lights.

The vehicle may further include a bumper, wherein the at least one front brake indicator light is disposed at at least a portion of the bumper.

The foregoing and/or other features and utilities of the present general inventive concept may also be achieved by providing a brake light indicator system for a vehicle, the brake light indicator system including a brake pedal to allow the vehicle to slow down in response to a driver depressing the brake pedal, at least one front brake indicator light disposed at a front portion of the vehicle, and a sensor to transmit a signal to the at least one front brake indicator light in response to the driver depressing the brake pedal, such that the at least one front brake indicator light illuminates in response to receiving the signal.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
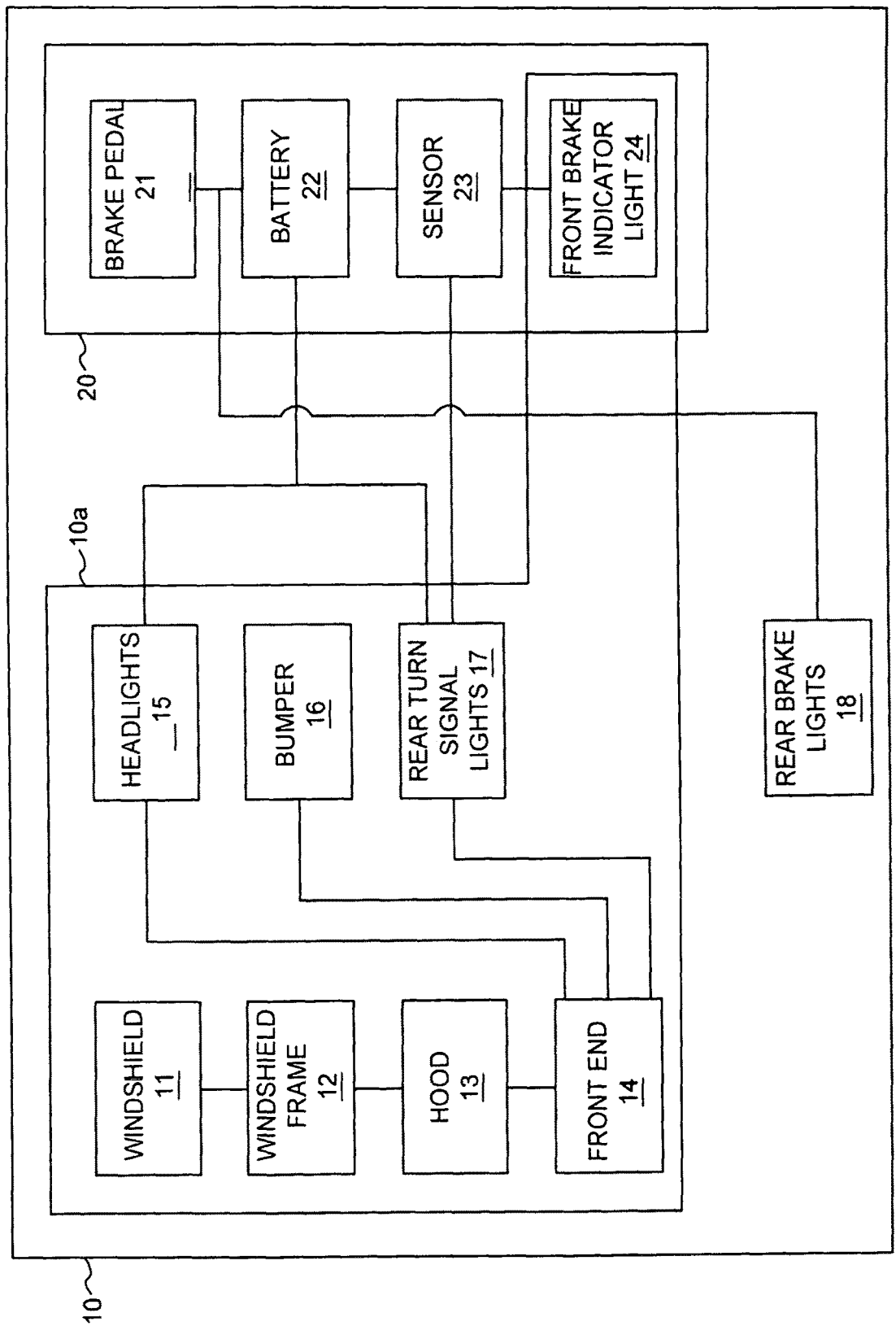
FIG. 1 is a block diagram illustrating a vehicle implementing a front brake light indicator system, according to an exemplary embodiment of the present general inventive concept.

FIG. 1 is a block diagram illustrating a vehicle 10 implementing a front brake light indicator system 20, according to an exemplary embodiment of the present general inventive concept.

Referring to FIG. 1, the vehicle 10 may include all typical vehicle components included in conventional vehicles well known to one of ordinary skill in the art. For example, the vehicle 10 may include a front portion 10a including a windshield 11, a windshield frame 12, a hood 13, a front end 14, headlights 15, a bumper 16, and a rearview mirror 17, and rear brake lights 18, but is not limited thereto.

The front brake light indicator system 20 may include a brake pedal 21, a battery 22, a sensor 23, and at least one front brake indicator light 24. Alternatively, the battery 22 may be provided in another portion of the vehicle 10.

As illustrated in FIG. 1, the at least one front brake indicator light 24 may be located at the front portion 10a, and may be connected to, disposed on, or be a part of, at least one of the windshield 11, the windshield frame 12, the hood 13, the front end 14, and the bumper 16.

The brake pedal 21 may allow the vehicle to slow down and/or stop in response to a driver depressing the brake pedal 21.

The sensor 23 may sense when the brake pedal 21 is depressed by a driver, and may transmit a signal to the rear brake lights 18 and/or the at least one front brake indicator light 24, such that the rear brake lights 18 and/or the at least one front brake indicator light 24 illuminate.

The at least one front brake indicator light 24 may be disposed at the front portion 10a of the vehicle 10.

The battery 22 may provide power to the vehicle 10, such that all electronic components within the vehicle 10 requiring power may function. For example, the battery 22 may provide power to an anti-lock braking system that activates when the brake pedal 21 is depressed by the driver. Similarly, the battery 22 may provide power to the sensor 23 and to the rear brake lights 18, such that the rear brake lights 18 illuminate in response to the brake pedal 21 being depressed by the driver.

When the brake pedal 21 is depressed, the sensor 23 (which may be a different sensor than the sensor that causes the rear brake lights 18 to illuminate) may cause the at least one front brake indicator light 24 to illuminate, thereby alerting any pedestrians in front of the vehicle 10 that the vehicle 10 is slowing down and/or stopping. As such, if the vehicle 10 is in motion and the at least one front brake indicator light 24 does not illuminate, then the pedestrians may be alerted to the fact that the vehicle 10 is not slowing down and/or stopping.

The at least one front brake indicator light 24 may be a series of light emitting diodes, halogen lights, fluorescent lights, incandescent lights, or any other types of lights that are clearly visible by pedestrians. Moreover, the at least one front brake indicator light 24 may be any color, including red, white, green, blue, purple, yellow, orange, etc., but is not limited thereto.

The following exemplary embodiments of FIGS. 2 through 7 include different positions of front brake indicator lights on the vehicle 10, which all may function in a similar manner as described above with reference to FIG. 1. Accordingly, the other elements of the front brake light indicator system 20, such as the brake pedal 21, the battery 22, the sensor 23, may function in a similar manner as described above with reference to FIG. 1.

Figure 2:
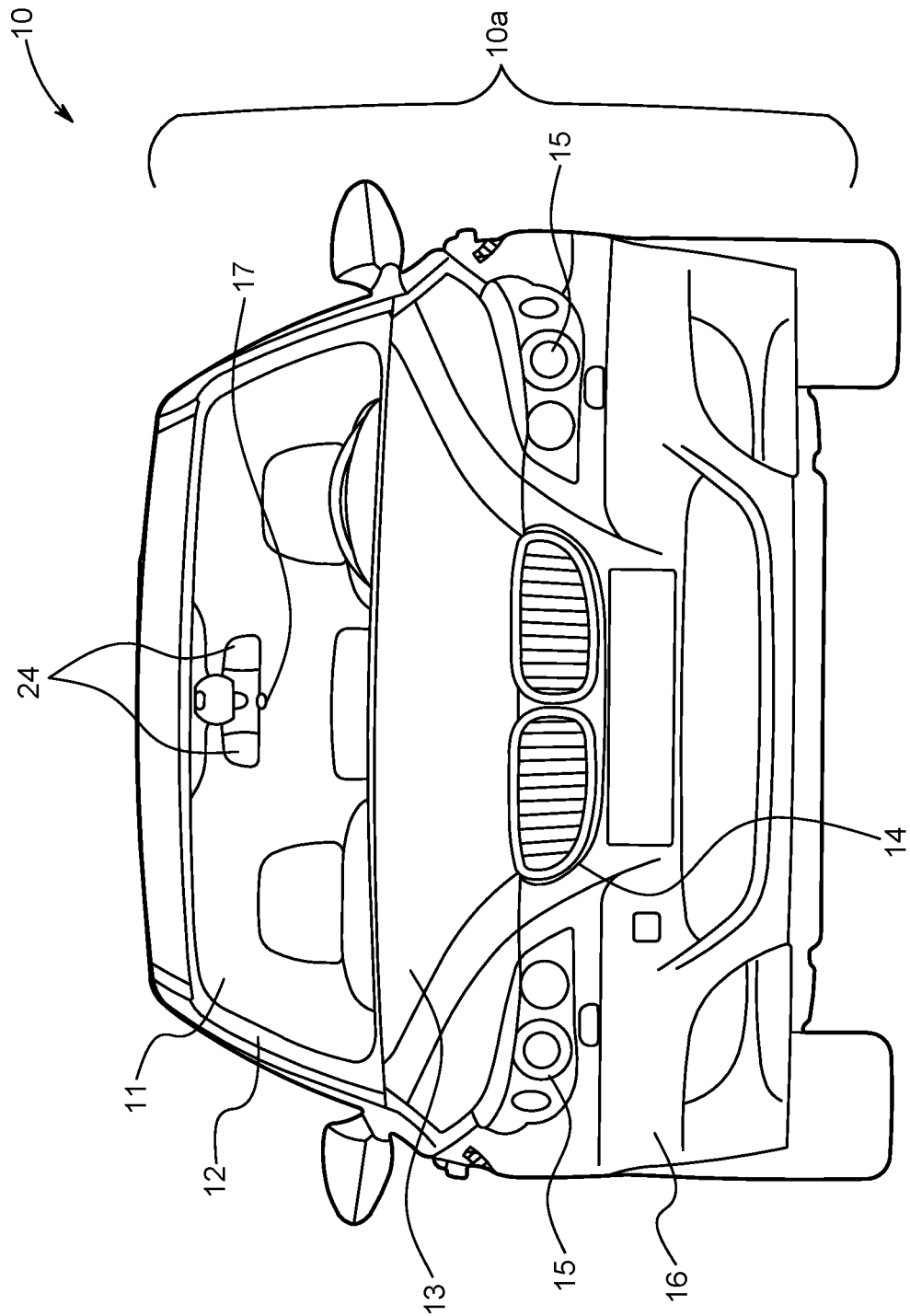
FIG. 2 is a front view of a vehicle implementing the at least one front brake indicator light disposed at a rearview mirror, according to an exemplary embodiment of the present general inventive concept.

FIG. 2 is a front view of the vehicle 10 implementing the at least one front brake indicator light 24 disposed at the rearview mirror 17, according to an exemplary embodiment of the present general inventive concept.

Referring to FIG. 2, the at least one front brake indicator light 24 may be disposed on a back portion (i.e., non-mirrored side) of the rearview mirror 17. The at least one front brake indicator light 24 may include a single light extending across at least a portion of the back portion of the rearview mirror 17, or alternatively, may include a plurality of front brake indicator lights 24 disposed on left and right sides of the back portion of the rearview mirror 17, as illustrated specifically in FIG. 2.

Figure 3:
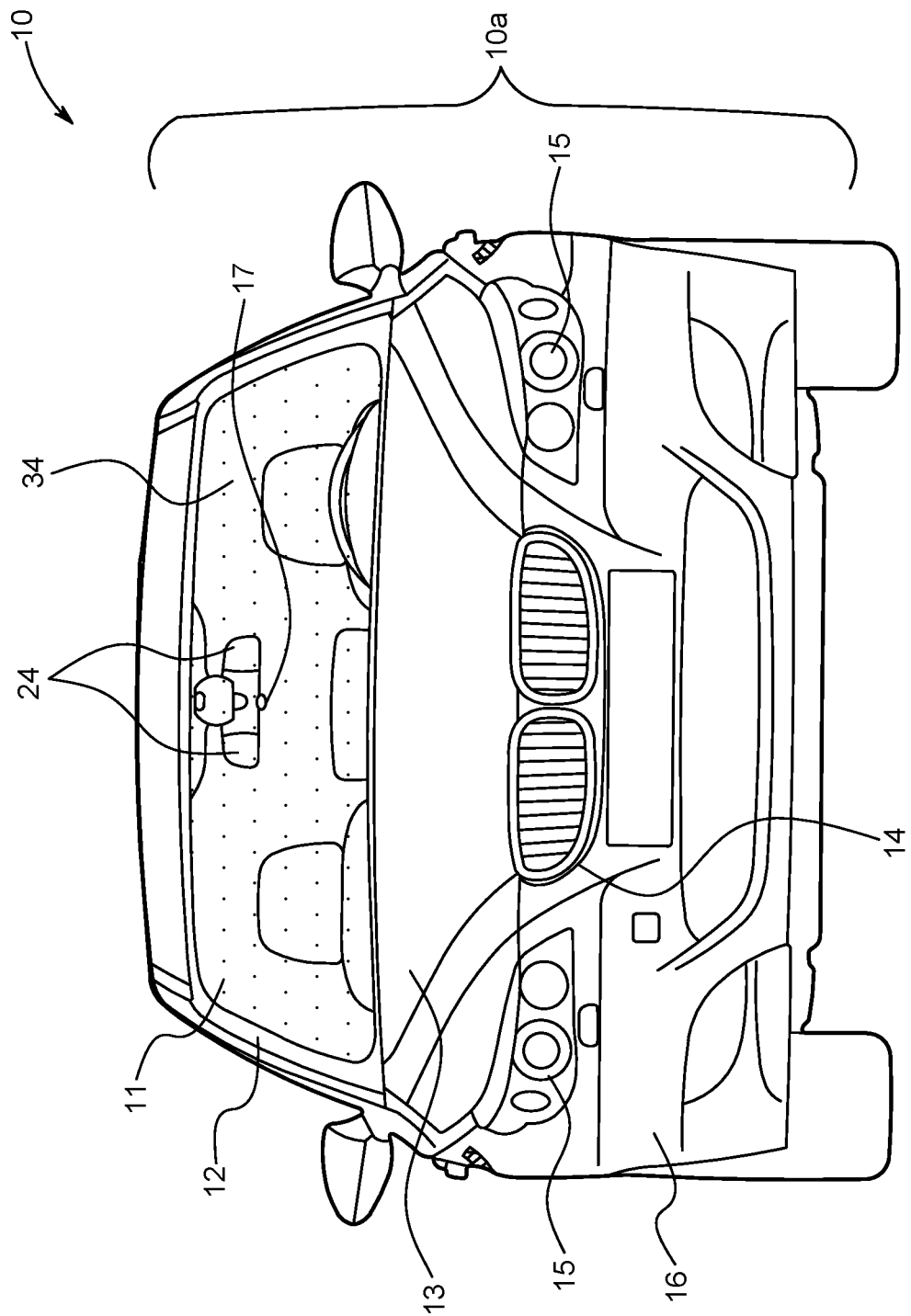
FIG. 3 is a front view of a vehicle implementing the at least one front brake indicator light disposed at a windshield, according to another exemplary embodiment of the present general inventive concept.

FIG. 3 is a front view of the vehicle 10 implementing the at least one front brake indicator light 34 disposed at the windshield 11, according to another exemplary embodiment of the present general inventive concept.

Referring to FIG. 3, the at least one front brake indicator light 34 may be disposed on or within the entire windshield 11 as a matrix of very small lights or light-strings disposed across an entirety of the windshield 11, which cause the entire windshield 11 to appear illuminated when the brake pedal 21 is depressed by the driver. The at least one front brake indicator light 34 may be relatively transparent and/or translucent, in order to allow the driver to clearly see through the windshield 11, even when the at least one front brake indicator light 34 is illuminated.

Figure 4:
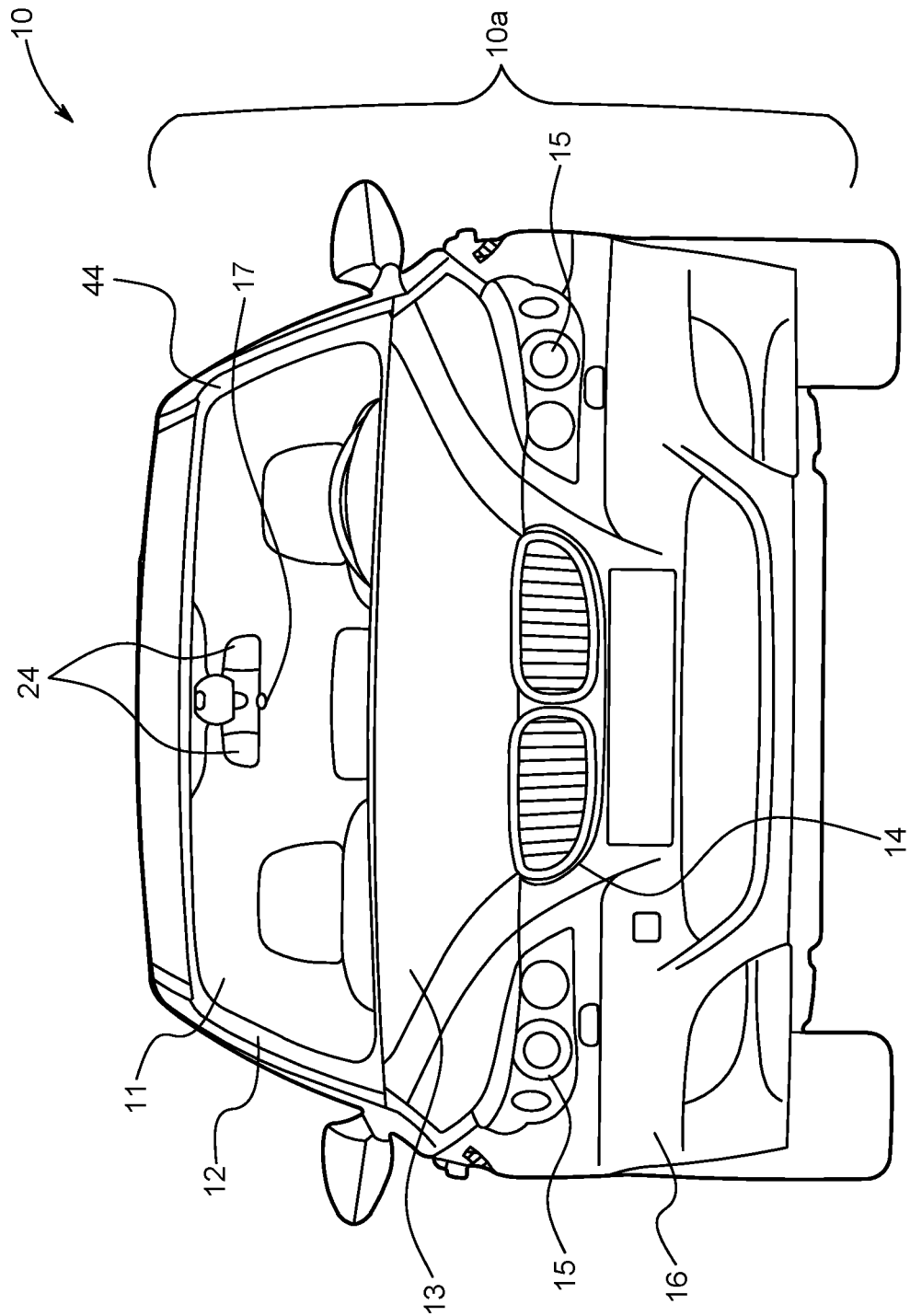
FIG. 4 is a front view of a vehicle implementing the at least one front brake indicator light disposed at a windshield frame, according to another exemplary embodiment of the present general inventive concept.

FIG. 4 is a front view of the vehicle 10 implementing the at least one front brake indicator light 44 disposed at the windshield frame 12, according to another exemplary embodiment of the present general inventive concept.

Referring to FIG. 4, the at least one front brake indicator light 44 may be disposed on an entirety of the windshield frame 12, or just a portion thereof, such that the at least one front brake indicator light 44 is clearly visible to pedestrians when illuminated.

Figure 5:
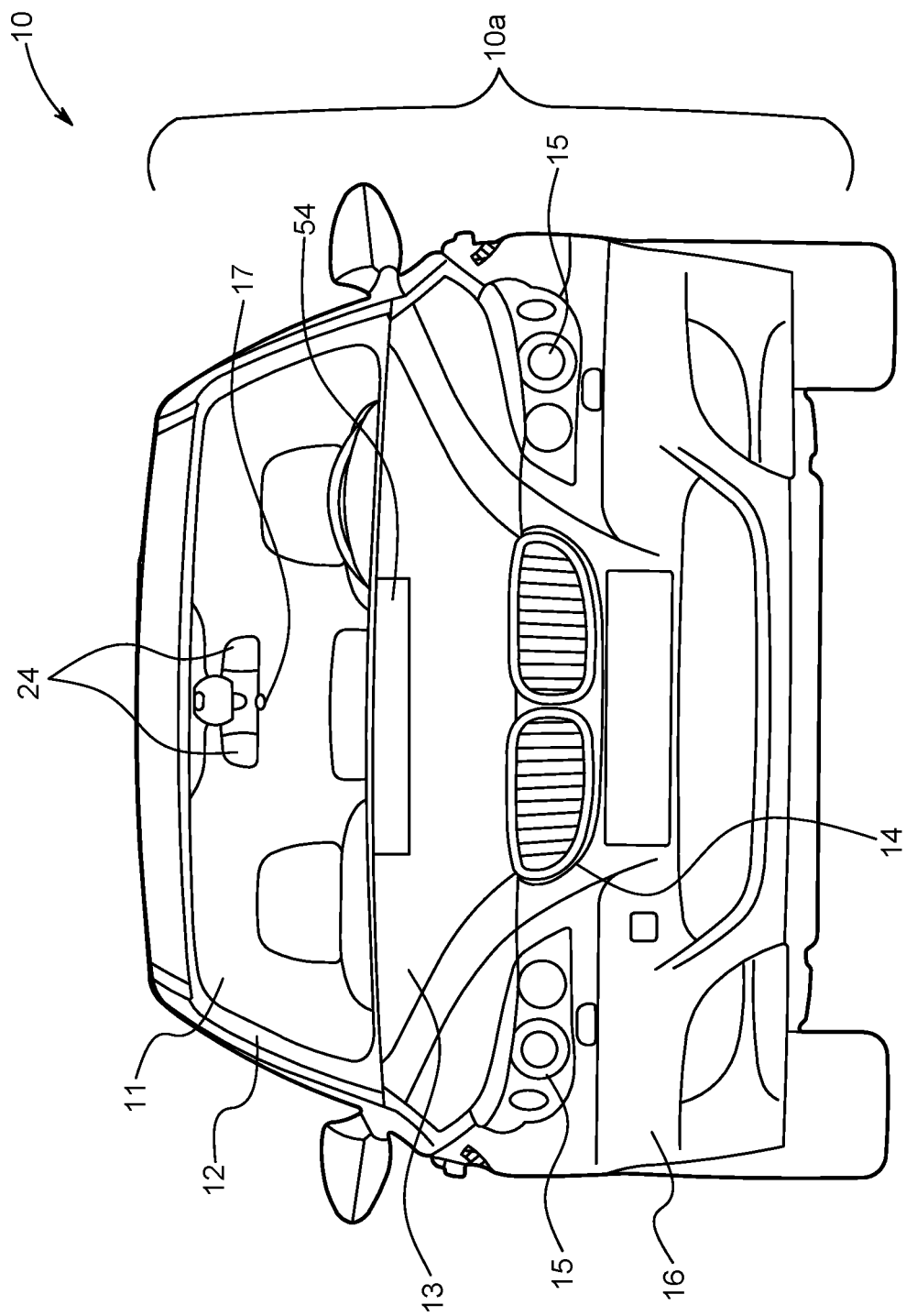
FIG. 5 is a front view of a vehicle implementing the at least one front brake indicator light disposed at a hood, according to another exemplary embodiment of the present general inventive concept.

FIG. 5 is a front view of the vehicle 10 implementing the at least one front brake indicator light 54 disposed at the hood 13, according to another exemplary embodiment of the present general inventive concept.

Referring to FIG. 5, the at least one front brake indicator light 54 may be disposed on at least a portion of the hood 13, such the at least one front brake indicator light 54 is clearly visible to pedestrians when illuminated.

Figure 6:
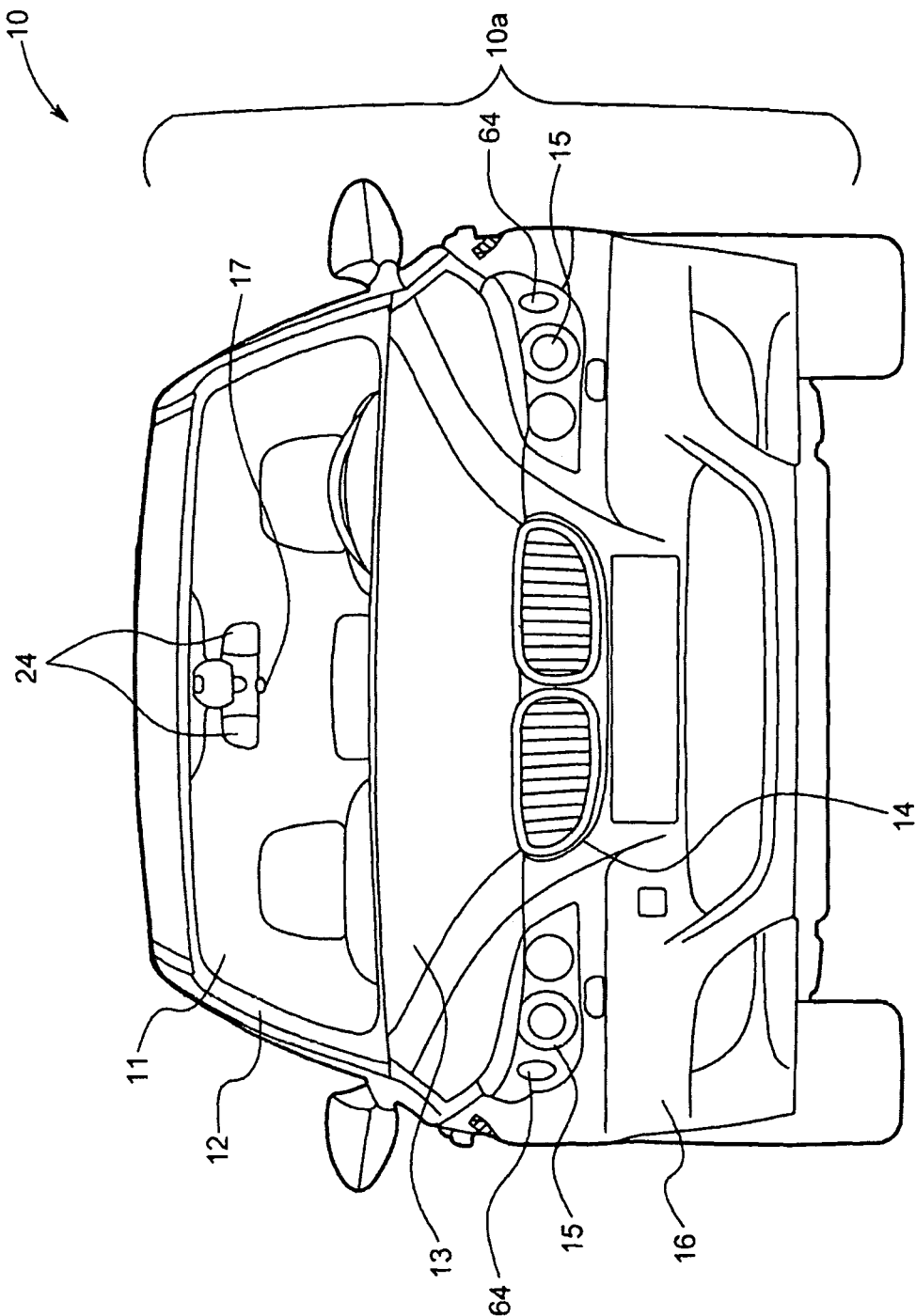
FIG. 6 is a front view of a vehicle implementing the at least one front brake indicator light disposed at a front end, according to another exemplary embodiment of the present general inventive concept.

FIG. 6 is a front view of the vehicle 10 implementing the at least one front brake indicator light 64 disposed at the front end 14, according to another exemplary embodiment of the present general inventive concept.

Referring to FIG. 6, the at least one front brake indicator light 64 may be disposed on at least a portion of the front end 14, for example, near the head lights 15, such the at least one front brake indicator light 64 is clearly visible to pedestrians when illuminated.

Figure 7:
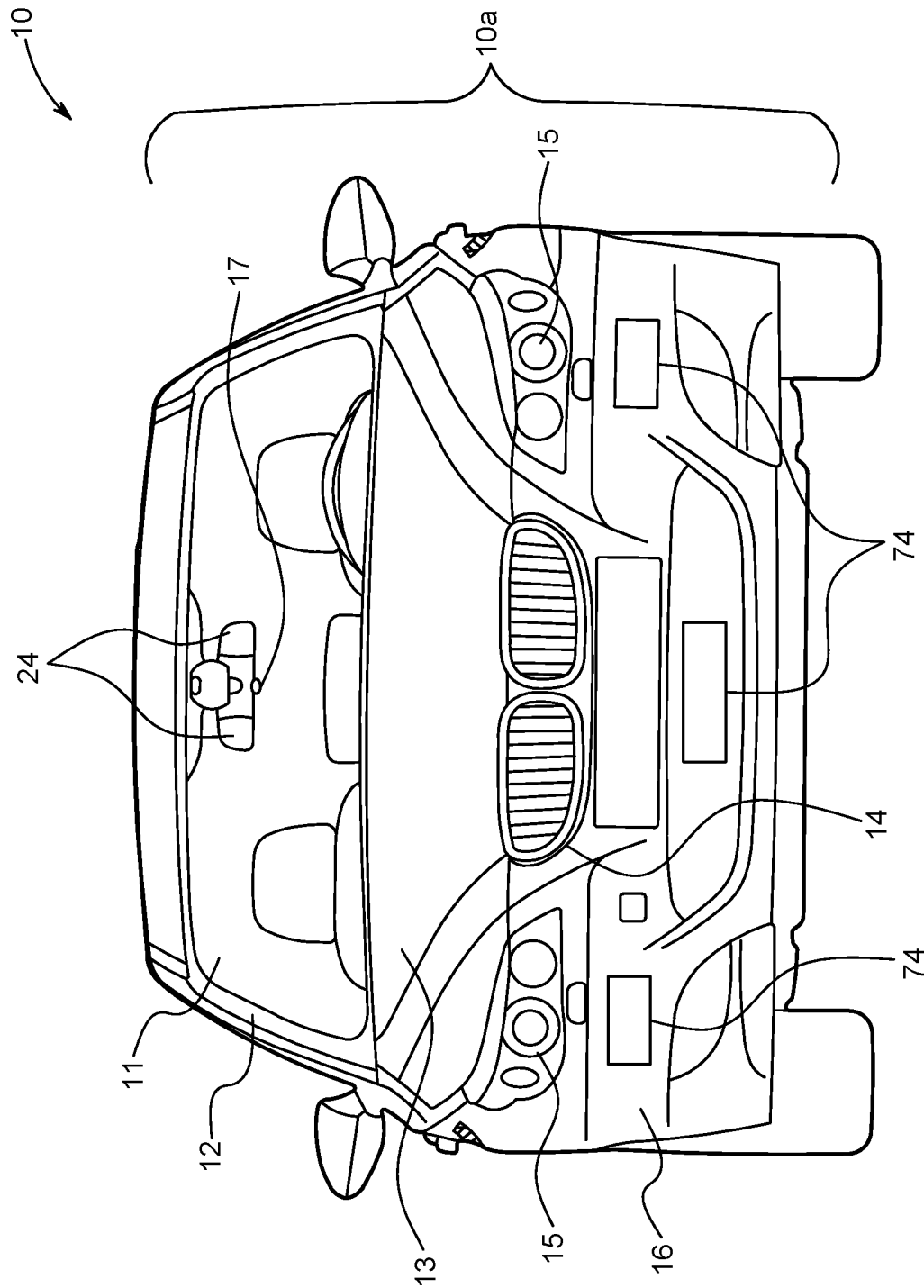
FIG. 7 is a front view of a vehicle implementing the at least one front brake indicator light disposed at a bumper, according to another exemplary embodiment of the present general inventive concept.

FIG. 7 is a front view of the vehicle 10 implementing the at least one front brake indicator light 74 disposed at the bumper 16, according to another exemplary embodiment of the present general inventive concept.

Referring to FIG. 7, the at least one front brake indicator light 74 may be disposed on at least a portion of the bumper 16, such the at least one front brake indicator light 74 is clearly visible to pedestrians when illuminated.

Additionally, the at least one front brake indicator light may be disposed on a front portion, a back portion, a side portion, a top portion, and/or a bottom portion of side mirrors on the vehicle.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A vehicle implementing a brake light indicator system, the brake light indicator system comprising:
    a brake pedal to allow the vehicle to slow down in response to a driver depressing the brake pedal;
    at least one front brake indicator light disposed within a windshield of the vehicle to variably flash, the at least one front brake indicator light comprising a matrix of very small lights disposed across an entirety of the windshield; and
    a sensor to transmit a signal to the at least one front brake indicator light in response to the driver depressing the brake pedal, such that the at least one front brake indicator light variably flashes in response to receiving the signal.

2. The vehicle of claim 1, further comprising:
    a rearview mirror disposed at the front portion of the vehicle, wherein the at least one front brake indicator light is disposed at a non-mirrored side of the rearview mirror.

3. The vehicle of claim 2, wherein the at least one front brake indicator light includes a first light disposed on a left side of the non-mirrored side of the rearview mirror and a second light disposed on a right side of the non-mirrored side of the rearview mirror.

4. The vehicle of claim 1, further comprising:
    a windshield disposed at the front portion of the vehicle, wherein the at least one front brake indicator light is disposed on or within the windshield.

5. The vehicle of claim 1, further comprising:
    a windshield frame disposed at the front portion of the vehicle, wherein the at least one front brake indicator light is disposed around at least a portion of the windshield frame.

6. The vehicle of claim 1, further comprising:
    a hood disposed at the front portion of the vehicle, wherein the at least one front brake indicator light is disposed at at least a portion of the hood.

7. The vehicle of claim 1, further comprising:
    a front end at the front portion of the vehicle, wherein the at least one front brake indicator light is disposed at at least a portion of the front end.

8. The vehicle of claim 1, further comprising:
    a front end at the front portion of the vehicle; and
    headlights disposed at the front end, wherein the at least one front brake indicator light is disposed at at least a portion of the front end near the headlights.

9. The vehicle of claim 1, further comprising:
    a bumper, wherein the at least one front brake indicator light is disposed at at least a portion of the bumper.

10. A brake light indicator system for a vehicle, the brake light indicator system comprising:
- a brake pedal to allow the vehicle to slow down in response to a driver depressing the brake pedal;
- at least one front brake indicator light disposed within a windshield of the vehicle, the at least one front brake indicator light comprising a matrix of very small lights disposed across an entirety of the windshield; and
- a sensor to transmit a signal to the at least one front brake indicator light in response to the driver depressing the brake pedal, such that the at least one front brake indicator light illuminates in response to receiving the signal.

* * * * *